(12) United States Patent
Weimar

(10) Patent No.: US 12,510,046 B2
(45) Date of Patent: Dec. 30, 2025

(54) FUEL SYSTEM

(71) Applicant: Maersk A/S, Copenhagen K (DK)

(72) Inventor: Henrik Bak Weimar, Copenhagen K (DK)

(73) Assignee: Maersk A/S, Copenhagen K (DK)

( * ) Notice: Subject to any disclaimer, the term of this patent is extended or adjusted under 35 U.S.C. 154(b) by 154 days.

(21) Appl. No.: 16/936,031

(22) Filed: Jul. 22, 2020

(65) Prior Publication Data

US 2020/0347810 A1  Nov. 5, 2020

Related U.S. Application Data

(63) Continuation of application No. PCT/EP2019/051564, filed on Jan. 23, 2019.

(30) Foreign Application Priority Data

Jan. 24, 2018  (GB) ..................................... 1801149

(51) Int. Cl.
*F02M 37/38* (2019.01)
*B63H 21/38* (2006.01)
(Continued)

(52) U.S. Cl.
CPC ............. *F02M 37/38* (2019.01); *B63H 21/38* (2013.01); *F02M 37/0023* (2013.01); (Continued)

(58) Field of Classification Search
CPC ........ F02M 37/38; F02M 37/50; F02M 37/32; B01D 29/66
See application file for complete search history.

(56) References Cited

U.S. PATENT DOCUMENTS

| 3,272,168 A | * | 9/1966 | Donohue | ............... B63H 21/14 |
| | | | | 114/74 R |
| 3,923,658 A | * | 12/1975 | Lancaster | ............... B01D 21/34 |
| | | | | 210/108 |

(Continued)

FOREIGN PATENT DOCUMENTS

| DE | 102009009495 A1 | * | 8/2010 | ............. B01D 29/33 |
| DE | 202016103007 U1 | * | 12/2016 | ............... F01M 1/10 |

(Continued)

OTHER PUBLICATIONS

Norwegian Maritime Authority. "Possible Hazards for Engines and Fuel Systems Using Heavy Fuel Oil in Cold Climate". Mar. 2016. <https://pame.is/images/03_Projects/AMSA/Heavy_Fuel_in_the_Arctic/Final_report_HFO_hazards_engines_and_fuels.pdf> (Year: 2016).*

(Continued)

*Primary Examiner* — Logan M Kraft
*Assistant Examiner* — Joshua Campbell
(74) *Attorney, Agent, or Firm* — EIP US LLP

(57) ABSTRACT

Disclosed is a fuel system (20) for an engine (4) of a marine vessel (1). The fuel system (20) comprises a settling tank (110) for cleaning fuel for the engine (4), and a service tank (130) for storing fuel for the engine (4). The fuel system (20) also comprises a filtration system (220) comprising a first filter (222) through which fuel flowing from the settling tank (110) to the service tank (130) passes. The filtration system (220) is configured to be operable in a first mode in which the first filter (222) removes contaminants from fuel flowing from the settling tank (110) to the service tank (130), and in a second mode in which fuel flows from the service tank (130) through the first filter (222) to dislodge the contaminants from the first filter (222).

17 Claims, 3 Drawing Sheets

(51) Int. Cl.
*F02M 37/00* (2006.01)
*F02M 37/02* (2006.01)
*F02M 37/50* (2019.01)

(52) U.S. Cl.
CPC ........ *F02M 37/0088* (2013.01); *F02M 37/02* (2013.01); *F02M 37/50* (2019.01)

(56) References Cited

U.S. PATENT DOCUMENTS

| | | | | |
|---|---|---|---|---|
| 4,482,461 | A * | 11/1984 | Hindman | B01D 29/925 210/791 |
| 4,618,431 | A * | 10/1986 | Hindman | B01D 35/157 210/791 |
| 6,517,722 | B1 | 2/2003 | Benenson et al. | |
| 6,890,434 | B2 | 5/2005 | Rott et al. | |
| 2001/0025739 | A1 * | 10/2001 | Woods | F01N 1/08 181/235 |
| 2001/0042709 | A1 * | 11/2001 | Janik | F02M 37/42 210/435 |
| 2001/0045222 | A1 * | 11/2001 | Hultqvist | F02M 37/40 134/169 R |
| 2004/0118764 | A1 * | 6/2004 | Miller | B01D 35/301 210/259 |
| 2006/0016432 | A1 | 1/2006 | Koehler et al. | |
| 2014/0165571 | A1 * | 6/2014 | Vertenoeuil | F02C 7/232 60/734 |
| 2014/0174407 | A1 * | 6/2014 | Koppel | F02D 19/06 123/495 |
| 2017/0333816 | A1 | 11/2017 | Olschok et al. | |

FOREIGN PATENT DOCUMENTS

| | | | |
|---|---|---|---|
| EP | 2784298 A1 * | 10/2014 | ........... F02M 37/221 |
| JP | 56104993 A * | 8/1981 | |
| JP | 11200973 A * | 7/1999 | ......... F02M 37/0064 |
| JP | 2000317224 A | 11/2000 | |
| JP | 2009241903 A | 10/2009 | |
| JP | 201022940 A1 * | 2/2010 | |
| JP | 2010022940 A | 2/2010 | |
| JP | 2011013237 A | 1/2011 | |
| JP | 2011183257 A | 9/2011 | |
| KR | 10-2016-0136842 A | 11/2016 | |
| WO | 2016138983 A1 | 9/2016 | |
| WO | 2016174299 A1 | 11/2016 | |
| WO | 2016206694 A1 | 12/2016 | |
| WO | 2017085643 A1 | 5/2017 | |
| WO | 2019145326 A1 | 8/2019 | |

OTHER PUBLICATIONS

International Search Report and Written Opinion dated Mar. 29, 2019 for PCT Application No. PCT/EP2019/051564.
United Kingdom Combined Search and Examination report dated Jul. 4, 2018 for GB Application No. GB1801149.4.
Hydac International, "Automatic Back-Flushing Filter AutoFilt RF9", Feb. 26, 2016.
Alfa Laval Corporate AB, "Automatic filters for fuel and lubricating oil", Oct. 20, 2016.
Mariner's Digest, "Automatic Backflushing Filters", https://marinersdigest.blogspot.in/2015/07/automatic-backflushing-filters.html, Jul. 25, 2015.
Man Diesel & Turbo, "Fuel Oil Backflushing Filter", May 1, 2016.
Singapore Search Report and Written Opinion dated Jan. 29, 2021 for Singapore Application No. 11202007045S.
Korean Office Action dated Jul. 29, 2021 for Korean Application No. 10-2020-7024112.
Japanese Office Action dated Jul. 9, 2021 for Japanese Application No. 2020-560571.
Danish Search Report dated Feb. 12, 2021 for Denmark Application No. PA 2020 01281.
International Search Report and Written Opinion dated Feb. 23, 2022 for PCT Application No. PCT/EP2021/081603.
Danish Examination report dated Sep. 14, 2021 for Denmark Application No. PA 2020 01281.
Korean Notice of Allowance dated Jan. 17, 2022 for Korean Patent Application No. 10-2020-7024112.

* cited by examiner

FUEL SYSTEM

CROSS-REFERENCE TO RELATED APPLICATIONS

This application is a continuation of International Application No. PCT/EP2019/051564, filed Jan. 23, 2019 which claims priority to UK Application No. GB1801149.4, filed Jan. 24, 2018, under 35 U.S.C. § 119(a). Each of the above-referenced patent applications is incorporated by reference in its entirety.

BACKGROUND OF THE INVENTION

Field of the Invention

The present invention relates to fuel systems for engines of marine vessels, to marine vessels comprising the fuel systems, and to methods of operating filtration systems of fuel systems for engines of marine vessels.

Description of the Related Technology

Marine vessels, such as container ships, have engines that are powered by heavy fuel oil (HFO) or the like. Such fuel is typically relatively pure and uncontaminated when it leaves the refinery. However, between the refinery and the vessel, the fuel can pick up solid contaminants, such as catalyst fines, rust, dust, sand, dirt and other solid particulates, for example from dirty hoses and tanks. Such solid contaminants can wear and/or block engine components, and so they should be removed from the fuel before the fuel enters an engine of the vessel. Fuel also can become contaminated with liquid contaminants, such as fresh or salt water.

There is a general understanding in the marine industry that sufficient and effective removal of contaminants from fuel aboard a marine vessel can only be achieved using one or more centrifugal separators (also known as purifiers), which separate particles and water from fuel. Therefore, conventional marine vessels typically have one or more such centrifugal separators fluidly connected between one or more settling tanks and one or more service tanks.

A settling tank is a deep tank in the engine room of a vessel, which is used to pre-clean fuels by gravity. A liquid mixture in the settling tank clears slowly as a heavier liquid and solids sink to the bottom under influence of gravity. Often, a marine vessel will have at least two settling tanks, each with a capacity sufficient for 24 hours full load operation of all consumers aboard the vessel. Settling tanks should be designed to encourage sludge and water separation, and may be provided with baffles to reduce mixing of sludge with the fuel. The bottom of a settling tank preferably slopes towards a sludge drain, and pump suction should not be not in the vicinity of the sludge space. The temperature in settling tanks should be as high as possible, to help the solids to settle. However, the temperature should be below 75 degrees Celsius, to avoid the formation of asphaltenes, and should be no lower than 7 degrees Celsius above the "pour point" of the fuel, to ensure pumpability. The pour point is the lowest temperature at which the fuel just flows thanks to its own weight.

A service tank is a fuel tank that contains a quantity of fuel ready for immediate use. Typically, at least one service tank per fuel to be used on board, necessary for propulsion and generator systems, is provided. A service tank should preferably have capacity for sufficient fuel to enable at least eight hours of operation, at sea, and at maximum continuous rating of the propulsion plant and/or generating plant associated with that service tank.

Centrifugal separators must operate for prolonged periods of time (or constantly) to separate water from oil, due to the similar densities of the water and oil. The energy required to power the centrifugal separators of a typical large marine vessel for a year is considerable, and may for example equate to that present in approximately 300 tonnes of HFO. Furthermore, approximately 1% of HFO processed by a centrifugal separator is contained in the sludge waste product it creates. Such sludge cannot be burnt and must be disposed of in an environmentally friendly manner.

Embodiments of the present invention aim to enable sufficient decontamination of fuel for an engine of a marine vessel while addressing the aforementioned problems.

SUMMARY

A first aspect of the present invention provides a fuel system for an engine of a marine vessel, the fuel system comprising: a settling tank for cleaning fuel for the engine; a service tank for storing fuel for the engine; and a filtration system comprising a first filter through which fuel flowing from the settling tank to the service tank passes; wherein the filtration system is configured to be operable in a first mode in which the first filter removes contaminants from fuel flowing from the settling tank to the service tank, and in a second mode in which fuel flows from the service tank through the first filter to dislodge the contaminants from the first filter.

Optionally, the filtration system comprises a second filter for removing the dislodged contaminants from fuel that has passed through the first filter when the filtration system is operating in the second mode.

Optionally, the second filter comprises a pleated textile filter.

Optionally, the first filter is connected to the settling tank via the second filter, whereby fuel from which the second filter has removed the dislodged contaminants is returnable to the settling tank.

Optionally, the filtration system comprises a collector for collecting the contaminants removed by the second filter.

Optionally, the collector is removable from the filtration system.

Optionally, the collector comprises a cartridge that is insertable in the second filter.

Optionally, the fuel system comprises a pump for pumping fuel through the second filter. Optionally, the pump for pumping fuel through the second filter is for pumping fuel through the second filter when the filtration system is operating in the second mode.

Optionally, the filtration system is configurable to create a circuit so that the pump for pumping fuel through the second filter is able to cause fuel to be passed through the second filter and back to the pump for pumping fuel through the second filter plural times. Optionally, the circuit is isolated from the first filter, so that the filtration system is operable in the first mode while the pump for pumping fuel through the second filter is causing fuel to be passed through the second filter and back to the pump for pumping fuel through the second filter plural times.

Optionally, the fuel system comprises a pump for pumping fuel from the service tank through the first filter when the filtration system is operating in the second mode.

Optionally, the service tank is connected to the first filter via the pump for pumping fuel from the service tank through the first filter.

Optionally, the fuel system comprises a valve through which fuel flowing from the settling tank to the first filter passes, and the valve is for controlling fuel flow from the first filter towards the settling tank.

Optionally, the filtration system is configured so that the valve is closed to prevent or hinder fuel flow from the first filter towards the settling tank, when the filtration system is operating in the second mode.

Optionally, the fuel system comprises a filtration system controller for controlling the filtration system.

Optionally, the filtration system comprises a sensor configured to detect a condition of the first filter or a parameter of fuel at a location between the first filter and the service tank, and to send a signal to the filtration system controller on the basis of the condition or parameter detected.

Optionally, the filtration system controller is configured to cause the filtration system to operate in the second mode on the basis of the signal.

A second aspect of the present invention provides a marine vessel comprising the fuel system of the first aspect of the present invention.

A third aspect of the present invention provides a method of operating a filtration system of a fuel system for an engine of a marine vessel, the method comprising: causing the filtration system to operate in a first mode whereby fuel flows from a settling tank of the fuel system to a service tank of the fuel system via a first filter of the filtration system, the first filter being for removing contaminants from the fuel; and causing the filtration system to operate in a second mode whereby fuel flows from the service tank through the first filter to dislodge the contaminants from the first filter.

Optionally, the causing the filtration system to operate in the first mode comprises causing operation of a pump to pump fuel from the settling tank to the service tank via the first filter.

Optionally, the method comprises receiving a signal indicative of a fuel pressure at a location between the first filter and the service tank.

Optionally, the method comprises receiving the signal while the filtration system is operating in the first mode.

Optionally, the method comprises causing closure of a valve to prevent or hinder fuel flow from the first filter towards the settling tank, when it is determined that the fuel pressure is less than a predetermined threshold fuel pressure.

Optionally, the causing the filtration system to operate in the second mode comprises causing operation of a pump to pump fuel from the service tank through the first filter to dislodge the contaminants from the first filter.

Optionally, the causing the filtration system to operate in the second mode comprises causing the contaminants that have been dislodged from the first filter and the fuel that has passed through the first filter when the filtration system is operating in the second mode to pass through a second filter of the filtration system, the second filter being for removing the dislodged contaminants from the fuel.

Optionally, the causing the filtration system to operate in the second mode comprises causing fuel from which the second filter has removed the dislodged contaminants to be returned to the settling tank.

A fourth aspect of the present invention provides a non-transitory computer-readable storage medium storing instructions that, if executed by a processor of a filtration system controller, cause the processor to carry out the method of the third aspect of the present invention.

BRIEF DESCRIPTION OF THE DRAWINGS

Embodiments of the invention will now be described, by way of example only, with reference to the accompanying drawings, in which.

DETAILED DESCRIPTION OF CERTAIN INVENTIVE EMBODIMENTS

Figure 1:
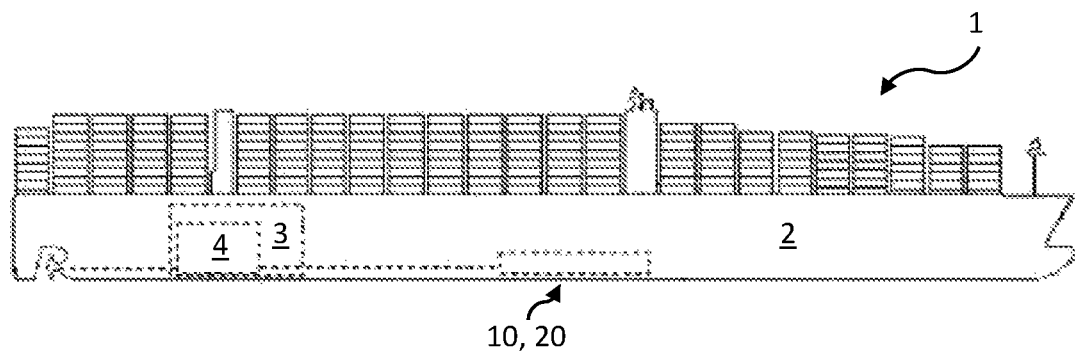
FIG. 1 shows a schematic side view of an example of a marine vessel according to an embodiment of the present invention.

FIG. 1 shows a schematic side view of an example of a marine vessel according to an embodiment of the present invention. In this embodiment, the vessel is a container ship 1. In other embodiments, the marine vessel may be another form of cargo vessel, such as a tanker, a dry-bulk carrier or a reefer ship, or a passenger vessel or any other marine vessel that uses liquid fuel, such as fuel oil or heavy fuel oil.

The marine vessel 1 has a hull 2 and one or more engine rooms 3 inside the hull 2. The marine vessel 1 is powered by one or more large internal combustion engines 4, such as four-stroke or two-stroke self-igniting combustion engines 4, located in an engine room 3. The engine(s) 4 drive(s) a propulsion mechanism (such as one or more propellers). The vessel 1 may also comprise one or more auxiliary engines (known as generator sets) that provide power and/or heat for various consumers of power aboard the vessel 1. The vessel 1 also comprises a fuel system 10, 20 for supplying fuel to the engine(s) 4. The fuel system 10, 20 may be any fuel system described herein as an embodiment of the present invention, such as that shown in FIG. 2 or that shown in FIG. 3.

The skilled person will be familiar with the components and systems of a marine vessel, and so further detailed discussion thereof is omitted for brevity.

As noted above, solid contaminants in fuel can wear and/or block engine components, and so it is highly preferable that such solid contaminants be removed from the fuel before the fuel enters the engine. As also noted above, there is a common understanding in the marine industry that sufficient and effective removal of contaminants from fuel aboard a marine vessel can only be achieved using one or more centrifugal separators. This is at least in part because it is believed in the industry that it is essential to remove both solid contaminants and liquid contaminants (e.g. fresh or salt water) from the fuel. However, contamination of fuel by water is rare (or usually present only to a small degree), and an engine (e.g. a diesel engine) of a marine vessel is, in most cases, able to burn fuel (such as HFO) even if there is some contamination by water. Accordingly, the present invention is predicated on a view that it is sufficient for solid contaminants to be removed from fuel before the fuel enters an engine, and that liquid contaminants (particularly water) need not be removed.

One known way of removing solid contaminants from oil on a marine vessel is through the use of a filter. However, while it is known to use filters for filtering lubrication oils, it is generally not preferred in the marine industry to use a filter to filter fuel. This is because the filter would become blocked with the solid contaminants, resulting in the efficiency of the system decreasing. Once blocked, a filter can be partially unblocked by back flushing air through the filter to remove the particulate matter from the filter. However, air has a relatively low inertia, and so once a small portion of a filter is cleaned, the air will thereafter all flow through the cleaned portion of the filter without dislodging the particular matter on the rest of the filter. Therefore, air is not particularly effective at removing particulate matter from the surface of a filter.

Embodiments of the present invention provide fuel systems for use in carrying out removal of solid contaminants from fuel while addressing the aforementioned problems.

Figure 2:
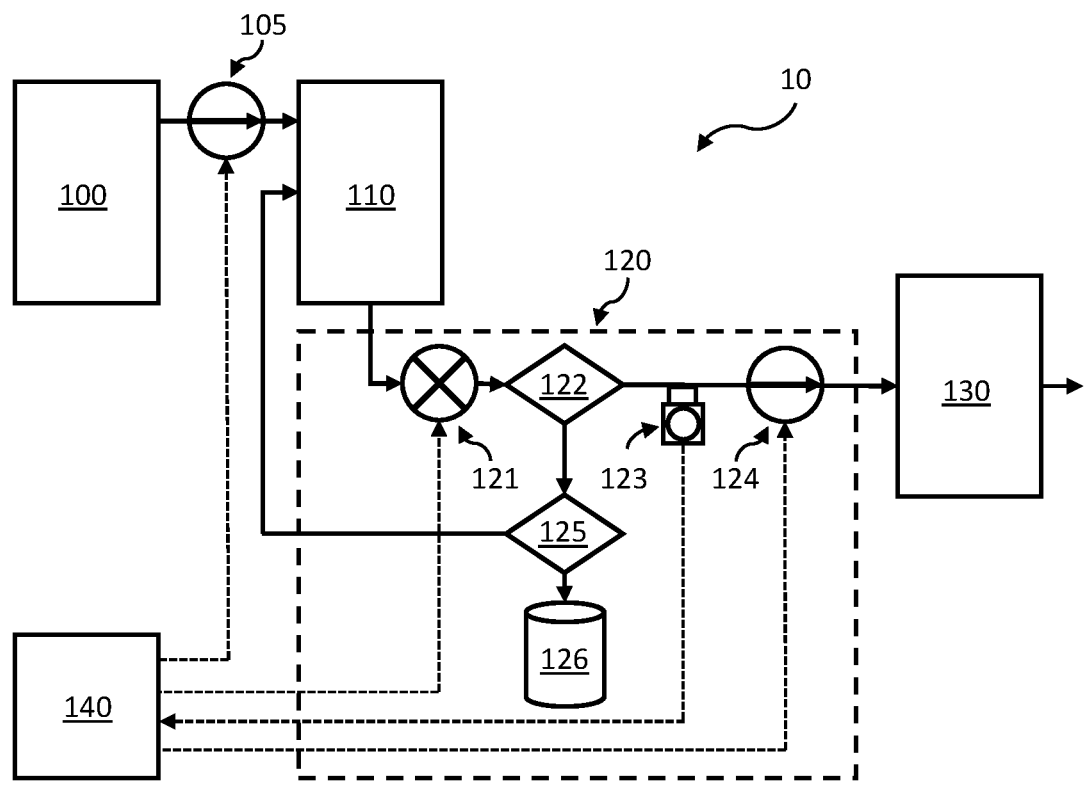
FIG. 2 shows a schematic view of an example of a fuel system according to an embodiment of the present invention.

FIG. 2 shows a schematic view of an example of a fuel system according to an embodiment of the present invention. The fuel system 10 is for an engine of a marine vessel. By "for an engine" it is meant that the fuel system 10 is for one or more engines of the marine vessel. That is, the fuel system 10 may be for supplying fuel to one engine or to plural engines of a marine vessel, such as the engines 4 and marine vessel 1 shown in FIG. 1 or any variants thereof described herein.

Broadly speaking, the fuel system 10 comprises a settling tank 110 for cleaning fuel for the engine 4; a service tank 130 for storing fuel for the engine 4; and a filtration system 120 comprising a first filter 122 through which fuel flowing from the settling tank 110 to the service tank 130 passes. As will be described in more detail below, the filtration system 120 is configured to be operable in a first mode in which the first filter 122 removes contaminants from fuel flowing from the settling tank 110 to the service tank 130, and in a second mode in which fuel flows from the service tank 130 through the first filter 122 to dislodge the contaminants from the first filter 122.

More specifically, in this embodiment the fuel system 10 comprises a storage tank 100 for storing a volume of fuel for the engine 4. In some embodiments, the fuel system 10 may comprise a plurality of such storage tanks 100. The storage tanks 100 are also known as bunker tanks 100. The storage tanks 100 store fuel for auxiliary engines, boilers or anything else that consumes fuel in addition to the main engine 4. The storage tank 100 may be Tillable during fueling of the vessel 1 (sometimes known as a bunkering operation) from a container onboard another vessel, such as a barge, or vehicle or on shore. If the fuel is a heavy and viscous fuel, such as HFO, then the settling tank 110 may be heated (such as to approximately 80 degrees Celsius), in order to reduce the viscosity and thickness of the fuel. This makes pumping the fuel easier through the fuel system 10. In some embodiments, the fuel can be heated to above 100 degrees Celsius to evaporate water from the settling tank 110.

The fuel system 100 also comprises a fuel transfer pump 105 for pumping fuel from the storage tank 100 to the settling tank 110. In this embodiment, the storage tank 100 is fluidly connected to the settling tank 110 via the fuel transfer pump 105, so that fuel is flowable from the storage tank 100 to the settling tank 110 via the fuel transfer pump 105. In other embodiments, the fuel transfer pump 105 may be located elsewhere. For example, in some embodiments fuel transfer pump 105 may be located in the storage tank 100 or in the settling tank 110. In some embodiments, the storage tank 100 and/or the fuel transfer pump 105 may be omitted. For example, in some embodiments, fuel may be able to flow from the storage tank 100 to the settling tank 110 under the influence of gravity.

In some embodiments, the fuel system 10 comprises one or more valves (not shown) through which fuel flowing from the storage tank 100 to the settling tank 110 passes. The valve(s) may be for controlling fuel flow between the storage tank 100 and the settling tank 110. More specifically, the valve(s) may be for controlling fuel flow from the storage tank 100 to the settling tank 110, and/or may be for controlling fuel flow from the settling tank 110 to the storage tank 100. For example, the valve(s) may be closable to prevent or hinder fuel flow from the storage tank 100 to the settling tank 110, and/or to prevent or hinder fuel flow from the settling tank 110 to the storage tank 100.

In this embodiment, the settling tank 110 is fluidly connectable to the service tank 130 via the first filter 122, so that fuel is flowable from the settling tank 110 to the service tank 130 via the first filter 122. Different types of filter can be used for the first filter 122 in different embodiments. The first filter 122 can for example comprise a surface filter, where particulate matter builds up on the surface of the first filter 122, or a depth filter, where particular matter is trapped inside the filter medium. The first filter 122 may comprise one or more filter cloths or meshes for allowing passage of liquid but preventing flow of solid matter over a certain particulate size. The first filter 122 may comprise one or more different filter screen configurations where the filter comprises different weaves or mesh configurations. In some embodiments, the filter medium of the first filter 122 can be made from one or more of paper, pleated paper filters, cellulose, woven, knitted or wound fibres such as cloth, ceramic fibres, fabrics, foams, ceramic foams, metal fibre filters, sintered metal, and/or wall-flow monolith structures.

The filtration system 120 of this embodiment comprises a valve 121 through which fuel flowing from the settling tank 110 to the first filter 122 passes. The valve 121 is for controlling fuel flow between the first filter 122 and the settling tank 110. More specifically, the valve 121 is for controlling fuel flow from the first filter 122 to the settling tank 110. As will be further described below, the filtration system 120 is configured so that the valve 121 is closed to prevent or hinder fuel flow from the first filter 122 towards the settling tank 110, when the filtration system 120 is operating in the second mode. In some embodiments, the valve 121 may be a non-return valve (also known as a check valve or one-way valve) configured so that fuel is unable to flow from the first filter 122 to the settling tank 110 via the valve 121, and so the valve 121 may not need actively closing. In some embodiments the valve 121 is selectively operable from a remote controller (not shown). In other embodiments, the valve 121 may be omitted. In some such other embodiments, the settling tank 110 may be permanently fluidly connected to the service tank 130 via the first filter 122. However, fuel flowing through the first filter 122 when the filtration system 120 is operating in the second mode could carry dislodged contaminants from the first filter 122 back to the settling tank 110. This could be undesirable, since it could increase the ratio of contaminants to fuel in the settling tank 110. In some embodiments, however, it could nevertheless be intentional or desirable to collect the dislodged contaminants in the settling tank 110.

In some embodiments, the fuel system 10 may comprise one or more pre-filters or strainers for removing particularly large particulate matter before the fuel passes through the first filter 122 when the filtration system 120 is operating in the first mode.

In this embodiment, the filtration system 120 comprises a second pump 124 for pumping fuel from the service tank 130 through the first filter 122 when the filtration system 120 is operating in the second mode. In this embodiment, the service tank 130 is fluidly connected to the first filter 122 via the second pump 124, so that fuel is flowable from the service tank 130 to the first filter 122 via the second pump 124. In other embodiments, the second pump 124 may be located elsewhere. For example, in some embodiments the second pump 124 may be located in the service tank 130, or the second filter 125 (discussed below) may be connected to the first filter 122 via the second pump 124. In some embodiments, the second pump 124 may be integral with the first filter 122. In some embodiments, the second pump 124 may be omitted. For example, in some embodiments, fuel may be able to flow from the service tank 130 through the first filter 122 under the influence of gravity when the filtration system 120 is operating in the second mode. However, it is greatly preferred that the second pump 124 is provided, in order that the fuel passing through the first filter 122 when the filtration system 120 is operating in the second mode has sufficient momentum to dislodge the contaminants from the first filter 122.

In some embodiments, the second pump 124 is a bi-directional pump. Accordingly, in such embodiments the second pump 124 is for pumping fuel from the settling tank 110 to the service tank 130 via the first filter 122 when the filtration system 120 is operating in the first mode. In other embodiments, the second pump 124 is a unidirectional pump for pumping fuel from the service tank 130 through the first filter 122 when the filtration system 120 is operating in the second mode, and the filtration system 120 comprises a pump (not shown, but referred to herein for ease of reference as the third pump), separate from the second pump 124, for pumping fuel from the settling tank 110 to the service tank 130 via the first filter 122 when the filtration system 120 is operating in the first mode. In some embodiments, the settling tank 110 is fluidly connected to the service tank 130 via the third pump, so that fuel is flowable from the settling tank 110 to the service tank 130 via the third pump. More specifically, in some embodiments, the first filter 122 is fluidly connected to the service tank 130 via the third pump. In other embodiments, the third pump may be located elsewhere. For example, in some embodiments the third pump may be located in the service tank 130, or the settling tank 110 may be connected to the first filter 122 via the third pump. In some embodiments, the third pump may be omitted. For example, in some embodiments, fuel may be able to flow from the settling tank 110 through the first filter 122 and to the service tank 130 under the influence of gravity.

In this embodiment, the filtration system comprises a second filter 125 for removing the dislodged contaminants from fuel that has passed through the first filter 122 when the filtration system 120 is operating in the second mode. The second filter 125 may, for example, comprise a pleated textile filter such as paper. Different types of filter can be used for the second filter 125 in different embodiments. The second filter 125 can for example comprise a surface filter, where particulate matter builds up on the surface of the second filter 125, or a depth filter, where particular matter is trapped inside the filter medium. The second filter 125 may comprise one or more filter cloths or meshes for allowing passage of liquid but preventing flow of solid matter over a certain particulate size. The second filter 125 may comprise one or more different filter screen configurations where the filter comprises different weaves or mesh configurations. In some embodiments, the filter medium of the second filter 125 can be made from one or more of paper, pleated paper filters, cellulose, woven, knitted or wound fibres such as cloth, ceramic fibres, fabrics, foams, ceramic foams, metal fibre filters, sintered metal, and/or wall-flow monolith structures. In this embodiment, the filtration system 120 comprises a collector 126 for collecting the contaminants removed by the second filter 125. In some embodiments, the collector 126 is removable from the filtration system 120, such as for cleaning the collector 126 or for replacing the collector 126 when it is full or nearly full. For example, in some embodiments the collector 126 comprises a cartridge that is insertable in the second filter 125 and thereafter detachable from the second filter 125. In other embodiments, the collector 126 may be omitted.

In this embodiment, the first filter 122 is connected to the settling tank 110 via the second filter 125. Accordingly, fuel from which the second filter 125 has removed the dislodged contaminants is returnable to the settling tank 110. In some embodiments, a non-return valve (not shown) may be provided between the second filter 125 and the settling tank 110, and configured so that fuel in unable to flow from the settling tank 110 to the second filter 125 via the non-return valve.

In some embodiments, the second filter 125 may be omitted. For example, in some embodiments, the dislodged contaminants and the fuel that has passed through the first filter 122 when the filtration system 120 is operating in the second mode may be collected in a tank without being filtered. The tank could be the settling tank 110 or a different tank, for example, although as discussed above use of the settling tank 110 for this purpose could be undesirable, since it could increase the ratio of contaminants to fuel in the settling tank 110.

The fuel system 10 of this embodiment comprises a filtration system controller 140 for controlling the filtration system 120. The controller 140 may comprise one or more microprocessor(s). In this embodiment, the controller 140 is communicatively connected to, and for controlling, each of: the fuel transfer pump 105, the valve 121, and the second pump 124, as depicted by dashed lines in FIG. 2. In other embodiments, the controller 140 may be for controlling the third pump (not shown) discussed above. In some embodiments, some of these elements may be controlled by an entity other than the controller 140. Of course, in embodiments in which one or more of the fuel transfer pump 105, the valve 121, and the second pump 124 are omitted, the controller 140 would not be communicatively connected to, and for controlling, such omitted element(s).

In this embodiment, the filtration system 120 comprises a pressure sensor 123 configured to detect a fuel pressure at a location between the first filter 122 and the service tank 130, the fuel pressure being a parameter of fuel that has flowed through the first filter 122. The location in this embodiment is between the first filter 122 and the second pump 124, but in other embodiments the location may be elsewhere, such as between the second pump 124 and the service tank 130. In this embodiment, the pressure sensor 123 is communicatively connected to the controller 140, and is configured to send a signal indicative of the fuel pressure at the location to the controller 140. The controller 140 is configured to cause the filtration system 120 to operate in the second mode, when it is determined that the fuel pressure at the location is less than a predetermined threshold fuel pressure.

This determination could be made by the controller 140. For example, the pressure sensor 123 may be configured to detect the fuel pressure and send the signal to the controller 140 constantly, periodically, or when instructed by the controller 140, and the controller 140 may be configured to determine whether the fuel pressure is less than the predetermined threshold fuel pressure on the basis of the received signal, such as by extracting information from the received signal and/or comparing the received signal or extracted information to data to which the controller 140 has access. Alternatively, the determination could be made other than at the controller 140, such as at the pressure sensor 123. For example, the pressure sensor 123 may be configured to detect the fuel pressure constantly, periodically, or when instructed by the controller 140, and to send the signal to the controller 140 only when the fuel pressure is less than the predetermined threshold fuel pressure, such as by comparing the detected pressure with the predetermined threshold fuel pressure. The controller 140 could then be configured to cause the filtration system 120 to operate in the second mode on the basis of having received the signal. In any event, it will be understood that the filtration system 120 comprises a sensor 123 configured to detect a parameter (in this case, pressure) of fuel at a location between the first filter 122 and the service tank 130 and to send a signal to the controller 140 on the basis of the parameter detected, and the controller 140 is configured to cause the filtration system 120 to operate in the second mode on the basis of the signal (either a characteristic or content of the signal, or the reception of the signal).

Figure 3:
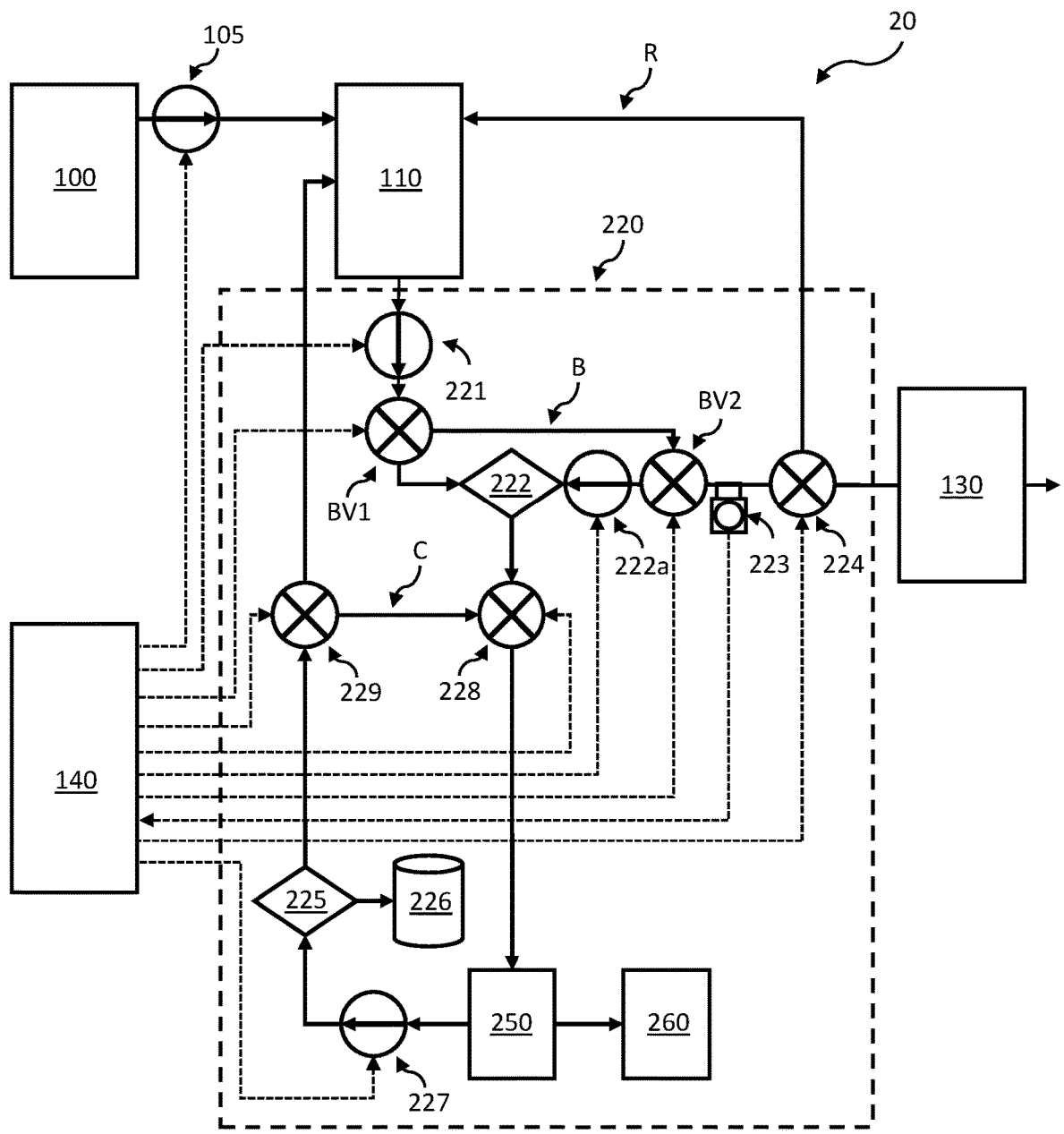
FIG. 3 shows a schematic view of an example of a fuel system according to another embodiment of the present invention.

FIG. 3 shows a schematic view of an example of another fuel system according to an embodiment of the present invention. The fuel system 20 again is for an engine of a marine vessel, such as the engines 4 and marine vessel 1 shown in FIG. 1 or any variants thereof described herein.

Broadly speaking, the fuel system 20 comprises a settling tank 110 for cleaning fuel for the engine 4; a service tank 130 for storing fuel for the engine 4; and a filtration system 220 comprising a first filter 222 through which fuel flowing from the settling tank 110 to the service tank 130 passes. The filtration system 220 is configured to be operable in a first mode in which the first filter 222 removes contaminants from fuel flowing from the settling tank 110 to the service tank 130, and in a second mode in which fuel flows from the service tank 130 through the first filter 222 to dislodge the contaminants from the first filter 222.

Similarly to the embodiment of FIG. 2, in this embodiment the fuel system 20 comprises a storage tank 100 for storing a volume of fuel for the engine 4, a fuel transfer pump 105 for pumping fuel from the storage tank 100 to the settling tank 110, and the storage tank 100 is fluidly connected to the settling tank 110 via the fuel transfer pump 105, so that fuel is flowable from the storage tank 100 to the settling tank 110 via the fuel transfer pump 105. However, in other embodiments, any of the variations to the storage tank 100 and/or fuel transfer pump 105 and/or the settling tank 110 (such as heating thereof) and/or elements (such as valve(s)) therebetween discussed herein with respect of the embodiment of FIG. 2 may be made to the embodiment of FIG. 3 to form further embodiments.

In this embodiment, the settling tank 110 is fluidly connectable to the service tank 130 via the first filter 222, so that fuel is flowable from the settling tank 110 to the service tank 130 via the first filter 222. Different types of filter can be used for the first filter 222 in different embodiments. The first filter 222 can for example comprise any one or more of the types of filter discussed herein for the first filter 122 of the embodiment of FIG. 2.

In this embodiment, the filtration system 220 comprises a fuel pump 221 for pumping fuel from the settling tank 110 through the first filter 222 to the service tank 130 when the filtration system 220 is operating in the first mode. In this embodiment, the settling tank 110 is fluidly connected to the first filter 222 via the fuel pump 221, so that fuel is flowable from the settling tank 110 to the first filter 222 via the fuel pump 221. In other embodiments, the fuel pump 221 may be located elsewhere. For example, in some embodiments the fuel pump 221 may be located in the settling tank 110, or between the first filter 222 and the service tank 130. In some embodiments, the fuel pump 221 may be integral with the first filter 222. In some embodiments, the fuel pump 221 may be omitted. For example, in some embodiments, fuel may be able to flow from the settling tank 110 through the first filter 222 under the influence of gravity when the filtration system 220 is operating in the first mode. However, it is greatly preferred that the fuel pump 221 is provided, to help the fuel system 20 reliably meet the fuel demand of the engine 4. Moreover, it is easier to push fuel through the first filter 222 than pull it, and so it is preferred to provide the fuel pump 221 upstream of the first filter 222, as illustrated. In some embodiments, the fuel pump 221 has a variable speed drive, for regulating the flow of fuel through the filtration system 220. The variable speed drive can be used to match consumption of the engine 4 to the flow rate of the fuel in the fuel system 20.

In some embodiments, the fuel pump 221 may be configured to prevent or hinder fuel flow from the first filter 222 towards the settling tank 110, when the filtration system 220 is operating in the second mode. In some embodiments, the filtration system 220 may comprise a valve (not shown) through which fuel flowing from the settling tank 110 to the first filter 222 passes, and for preventing or hindering fuel flow from the first filter 222 towards the settling tank 110, when the filtration system 220 is operating in the second mode. The valve may, for example, take any of the forms described herein for the valve 121 of the embodiment of FIG. 2.

In some embodiments, the fuel system 20 may comprise one or more pre-filters or strainers for removing particularly large particulate matter before the fuel passes through the first filter 222 when the filtration system 220 is operating in the first mode.

In this embodiment, the filtration system 220 comprises a backflush pump 222a, such as a piston pump, for pumping fuel from the service tank 130 through the first filter 222 when the filtration system 220 is operating in the second mode. In this embodiment, the backflush pump 222a is upstream of the first filter 222 when the filtration system 220 is operating in the second mode, so that the service tank 130 is fluidly connected to the first filter 222 via the backflush pump 222a and fuel is flowable from the service tank 130 to the first filter 222 via the backflush pump 222a. In this embodiment, the backflush pump 222a is integral with the first filter 222. In other embodiments, the backflush pump 222a may be located elsewhere. For example, in some embodiments the backflush pump 222a may be located between the service tank 130 and the first filter 222 and be non-integral with the first filter 222, or in the service tank 130, or the second filter 225 (discussed below) may be connected to the first filter 222 via the backflush pump 222a. In some embodiments, the backflush pump 222a may be omitted. For example, in some embodiments, fuel may be able to flow from the service tank 130 through the first filter 222 under the influence of gravity when the filtration system 220 is operating in the second mode. However, it is greatly preferred that the backflush pump 222a is provided, in order that the fuel passing through the first filter 222 when the filtration system 220 is operating in the second mode has sufficient momentum to dislodge the contaminants from the first filter 222.

In this embodiment, the filtration system 220 comprises a fuel return valve 224 via which the first filter 222 is connected to the service tank 130. The fuel return valve 224 is controllable by the filtration system controller 140 (discussed below) to direct fuel pumped by the fuel pump 221 either to the service tank 130 or back to the settling tank 110 via a fuel return path R that connects the fuel return valve 224 to the settling tank 110. It may be desirable to recirculate the fuel back to the settling tank 110 to regulate the fuel pressure when the vessel is in port, or during emptying of the service tank 130, or to pass the fuel through the first filter 222 more than once if the fuel has a particularly high degree of solid contaminants. In other embodiments, the fuel return valve 224 and the fuel return path R may be omitted.

Furthermore, in this embodiment, the filtration system 220 comprises first and second bypass valves BV1, BV2, which are connected by a bypass B. The first bypass valve BV1 is located between the fuel pump 221 and the first filter 222, and the second bypass valve BV2 is located between the backflush pump 222a and the service tank 130. In other embodiments, the second bypass valve BV2 may be located between the first filter 222 and the service tank 130 without bypassing the backflush pump 222a. The first and second bypass valves BV1, BV2 are controllable by the controller 140 to direct fuel pumped by the fuel pump 221 via the bypass B rather than via the first filter 222. This may be desirable to enable the pipes to be warmed before using the first filter 222. For example, fuel that may be warmed in the settling tank 110 is able to flow from the settling tank 110 via the fuel pump 221, the bypass B, the fuel return valve 224, and the fuel return path R and then return to the settling tank 110. The first and second bypass valves BV1, BV2 may then be controlled by the controller 140 to thereafter direct fuel pumped by the fuel pump 221 through the first filter 222 and on to the service tank 130. In other embodiments, the first and second bypass valves BV1, BV2 and the bypass B may be omitted.

In this embodiment, the filtration system 220 comprises a second filter 225 for removing the dislodged contaminants from fuel that has passed through the first filter 222 when the filtration system 220 is operating in the second mode (termed "backflush fuel" herein, for brevity). Different types of filter can be used for the second filter 225 in different embodiments. The second filter 225 can, for example, comprise any one or more of the types of filter discussed herein for the second filter 125 of the embodiment of FIG. 2. In this embodiment, the filtration system 220 comprises a collector 226 for collecting the contaminants removed by the second filter 225. In some embodiments, the collector 226 is removable from the filtration system 220, such as for cleaning the collector 226 or for replacing the collector 226 when it is full or nearly full. For example, in some embodiments the collector 226 comprises a cartridge that is insertable in the second filter 225 and thereafter detachable from the second filter 225. In other embodiments, the collector 226 may be omitted. In some embodiments, the second filter 225 may comprise a series of filters for removing different types of contaminants, such as rust, dirt, etc., and in some embodiments a collector (e.g. a removable cartridge) may be provided for each of the series of filters.

In some embodiments, the filtration system 120, 220 comprises a collector (not shown) for collecting contaminants removed by the first filter 122, 222. In some embodiments, such a collector is removable from the filtration system 120, 220, such as for cleaning the collector or for replacing the collector when it is full or nearly full. For example, in some embodiments the collector comprises a cartridge that is insertable in the first filter 122, 222 and thereafter detachable from the first filter 122, 222. In other embodiments, such a collector may be omitted. In some embodiments, the first filter 122, 222 may comprise a series of filters for removing different types of contaminants, such as rust, dirt, etc., and in some embodiments a collector (e.g. a removable cartridge) may be provided for each of the series of filters of the first filter 122, 222.

In some embodiments, the fuel system 20 may comprise one or more pre-filters or strainers for removing particularly large particulate matter before the backflush fuel passes through the second filter 225.

In this embodiment, the first filter 222 is connected to the settling tank 110 via the second filter 225. Accordingly, fuel from which the second filter 225 has removed the dislodged contaminants (termed "filtered backflush fuel" herein, for brevity) is returnable to the settling tank 110. In some embodiments, a non-return valve (not shown) may be provided between the second filter 225 and the settling tank 110, and configured so that fuel in unable to flow from the settling tank 110 to the second filter 225 via the non-return valve.

In some embodiments, the second filter 225 may be omitted. For example, in some embodiments, the dislodged contaminants and the backflush fuel carrying them may be collected in a tank without being filtered. The tank could be the settling tank 110 or a different tank, for example, although as discussed above use of the settling tank 110 for this purpose could be undesirable, since it could increase the ratio of contaminants to fuel in the settling tank 110.

In this embodiment, the filtration system 220 comprises a collecting tank 250, and the first filter 222 is connected to the second filter 225 via the collecting tank 250. Backflush fuel driven through the first filter 222 by the backflush pump 222a collects in the collecting tank 250. In this embodiment, the collecting tank 250 is fluidly connected to an overflow tank 260, so that a volume of backflush fuel exceeding that storable in the collecting tank 250 is able to flow from the collecting tank 250 into the overflow tank 260 as required. In other embodiments, the overflow tank 260 may be omitted. Indeed, in some embodiments, the collecting tank 250 also may be omitted.

Furthermore, in this embodiment, the filtration system 220 comprises a second filter pump 227, such as a piston pump, and the collecting tank 250 is connected to the second filter 225 via the second filter pump 227. The second filter pump 227 is operable to pump backflush fuel from the collecting tank 250 to and though the second filter 225 so that the second filter 225 can remove the contaminants from the backflush fuel. In some embodiments, the second filter pump 227 may be located between the collecting tank 250 and the second filter 225 and be non-integral with the second filter 225 (as illustrated). In other embodiments, the second filter pump 227 may be located elsewhere. For example, in some embodiments, the second filter pump 227 is integral with the second filter 225, or is in the collecting tank 250, or the second filter 225 may be connected to the settling tank 110 via the second filter pump 227. In some embodiments, the second filter pump 227 may be omitted. For example, in some embodiments, backflush fuel may be able to flow through the second filter 225 under the influence of gravity when the filtration system 220 is operating in the second mode. However, it is preferred that the second filter pump 227 is provided, at least to reduce the work required of the backflush pump 222*a* when the filtration system 220 is operating in the second mode.

In this embodiment, the filtration system comprises a first circulation valve 228 and a second circulation valve 229, which are joined by a circulation path C. The first circulation valve 228 is located between the first filter 222 and the second filter 225. More specifically, in this embodiment, the first circulation valve 228 is located between the first filter 222 and the collecting tank 250. The second circulation valve 229 is located between the second filter 225 and the settling tank 110. The first and second circulation valves 228, 229 are controllable by the filtration system controller 140 to direct filtered backflush fuel pumped by the second filter pump 227 back to the collecting tank 250 (when provided, or to the second filter 225 when not) via the circulation path C rather than to the settling tank 110. This may be desirable if the filtered backflush fuel is still contaminated after passing through the second filter 225. The first and second circulation valves 228, 229 may be controlled to cause this circulation for a prolonged period so that the backflush fuel undergoes several rounds of filtering by the second filter 225. In other words, the filtration system 220 is configurable to create a circuit so that the second filter pump 227 is able to cause fuel to be passed through the second filter 225 and back to the second filter pump 227 plural times. It will be noted that the circuit comprising the first and second circulation valves 228, 229, the circulation path C, the collecting tank 250, the second filter pump 227 and the second filter 225 can be isolated from the first filter 222 by the first and second circulation valves 228, 229, so that fuel can be circulated around this circuit while the first filter 222 continues to filter fuel on its way to the service tank 130. Therefore, the circuit may be isolated from the first filter 222, so that the filtration system 220 is operable in the first mode while the second filter pump 227 is causing fuel to be passed through the second filter 225 and back to the second filter pump 227 plural times. The first and second circulation valves 228, 229 may thereafter be controlled by the controller 140 to thereafter direct filtered backflush fuel pumped by the second filter pump 227 to the settling tank 110.

In some embodiments, a non-return valve (not shown) may be provided in the circulation path C between the first and second circulation valves 228, 229, and configured so that fuel is unable to flow from the first filter 222 to the second circulation valve 229 via the circulation path C. In some embodiments, the first circulation valve 228 may be omitted, and the circulation path C may be simply connected to the flow path connecting the first filter 222 with the second filter 225. In some embodiments, the first and second circulation valves 228, 229 and the recirculation path C may be omitted.

It will be appreciated that in FIG. 3 each of the fuel return valve 224, the first and second bypass valves BV1, BV2, and the first and second circulation valves 228, 229 is illustrated schematically as a single element at a junction of two flow paths. In some embodiments, any of these valves may comprise a single valve, such as a rotary selector valve, at the relevant junction. However, the skilled reader will appreciate that, in other embodiments, any of these valves instead may be implemented by (and thus comprise) plural valves located in the flow paths and operable to determine the flow path that fuel approaching the valve is to take.

The fuel system 20 of this embodiment comprises a filtration system controller 140 for controlling the filtration system 220. The controller 140 may comprise one or more microprocessor(s). In this embodiment, the controller 140 is communicatively connected to, and for controlling, each of: the fuel transfer pump 105, the fuel pump 221, the first and second bypass valves BV1, BV2, the backflush pump 222*a*, the fuel return valve 224, the second filter pump 227, and the circulation valves 228, 229, as depicted by dashed lines in FIG. 3. In some embodiments, some of these elements may be controlled by an entity other than the controller 140. Of course, in embodiments in which one or more of these elements is/are omitted, the controller 140 would not be communicatively connected to, and for controlling, such omitted element(s).

In this embodiment, the filtration system 220 comprises a pressure sensor 223 configured to detect a fuel pressure at a location between the first filter 222 and the service tank 130, the fuel pressure being a parameter of fuel that has flowed through the first filter 222. The location in this embodiment is between the backflush pump 222*a* and the second pump fuel return valve 224, but in other embodiments the location may be elsewhere, such as between the fuel return valve 224 and the service tank 130. In this embodiment, the pressure sensor 223 is communicatively connected to the controller 140, and is configured to send a signal indicative of the fuel pressure at the location to the controller 140. The controller 140 is configured to cause the filtration system 220 to operate in the second mode, when it is determined that the fuel pressure at the location is less than a predetermined threshold fuel pressure. As described above in relation to the embodiment of FIG. 2, this determination could be made by the controller 140, or other than at the controller 140, such as at the pressure sensor 223.

In other embodiments, additional or alternative sensors to the pressure sensor 123, 223 may be provided to detect a condition of the first filter 122, 222 or a parameter of fuel at a location between the first filter 122, 222 and the service tank 130. For example, a mass flow sensor can be used to obtain information about the amount of fuel flow between the first filter 122, 222 and the service tank 130. Other sensors such as viscosity sensors, density sensors or any sensor for measuring a parameter of the fuel can be used. A change in a parameter of the fuel at this location can indicate that the first filter 122, 222 needs to be backflushed. Any such employed sensor may be communicatively connected to the controller 140, and configured to send a signal to the controller 140 on the basis of the condition or parameter detected. The controller 140 may be configured to cause the filtration system 120, 220 to operate in the second mode on the basis of the signal (such as a characteristic or content of the signal, or the reception of the signal). In some other embodiments, there is no such sensor and the controller 140 receives a signal instead from a timer (not shown) indicating that a certain time period has elapsed since a previous backflushing of the first filter 122, 222. The controller 140 could be configured to then cause the filtration system 120, 220 to operate in the second mode on the basis of having received such a signal.

While there is shown only one filtration system 120, 220 in the fuel systems 10, 20 of FIGS. 2 and 3, in other embodiments the fuel system 10, 20 could comprise plural such filtration systems 120, 220 arranged in parallel, each comprising a first filter 122, 222 through which fuel flowing from the settling tank 110 to the service tank 130 passes. In some embodiments, the plural filtration systems 120, 220 may be operable independently of each other. Accordingly, in some embodiments, one of the filtration systems 120, 220 may be inactive or operating in one of the first and second modes, while another of the filtration systems 120, 220 is operating in one of the first and second modes. In some embodiments, the filtration system controller 140 of the fuel system 10, 20 is for controlling each of the plural filtration systems 120, 220. In other embodiments, each of the plural filtration systems 120, 220 may be controlled by a respective one of plural controllers 140.

Example methods of operating a filtration system of a fuel system for an engine of a marine vessel will now be described.

Figure 4:
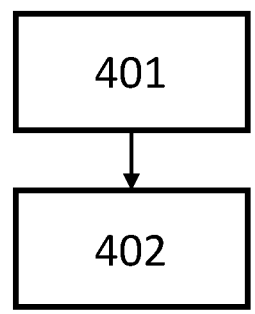
FIG. 4 shows a flow chart illustrating an example of a method of operating a filtration system according to an embodiment of the present invention.

FIG. 4 shows a flow chart illustrating an example of a method of operating a filtration system of a fuel system for an engine of a marine vessel according to an embodiment of the present invention. The method comprises causing 401 the filtration system 120, 220 (such as the filtration system 120 of FIG. 2 or the filtration system 220 of FIG. 3) to operate in a first mode whereby fuel flows from a settling tank 110 of the fuel system 10, 20 to a service tank 130 of the fuel system 10, 20 via a first filter 122, 222 of the filtration system 120, 220, the first filter 122, 222 being for removing contaminants from the fuel. The method also comprises causing 402 the filtration system 120, 220 to operate in a second mode whereby fuel flows from the service tank 130 through the first filter 122, 222 to dislodge the contaminants from the first filter 122, 222.

Figure 5:
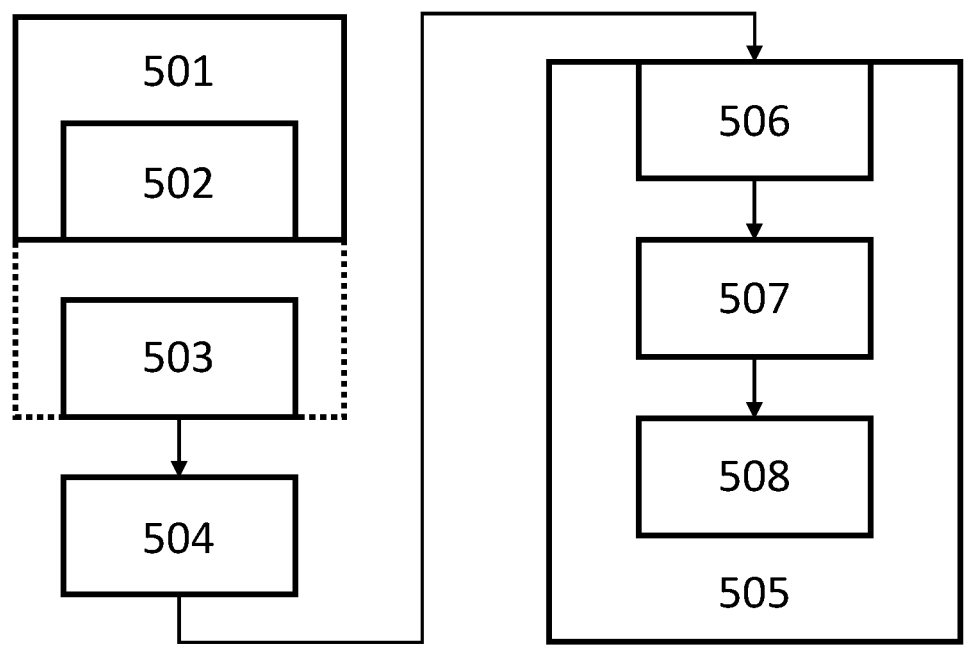
FIG. 5 shows a flow chart illustrating an example of another method of operating a filtration system according to an embodiment of the present invention.

Further methods of operating a filtration system of a fuel system for an engine of a marine vessel according to respective embodiments of the present invention will now be described with reference to FIG. 5. These methods will be described with reference to the filtration systems 120, 220 of FIGS. 2 and 3, but it will be appreciated that in still further embodiments the filtration system 120, 220 used in any of the methods may be any of the variations to the filtration systems 120, 220 of FIGS. 2 and 3 described herein.

The method comprises causing 501 a filtration system 120, 220 to operate in a first mode whereby fuel flows from a settling tank 110 of the fuel system 10, 20 to a service tank 130 of the fuel system 10, 20 via a first filter 122, 222 of the filtration system 120, 220, the first filter 122, 222 being for removing contaminants from the fuel.

In some embodiments, the causing 501 the filtration system to operate in the first mode comprises causing 502 operation of a pump to pump fuel from the settling tank 110 to the service tank 130 via the first filter 122, 222. The pump may be the second pump 124 shown in FIG. 2, the third pump discussed above, the fuel pump 221 shown in FIG. 3, or another pump. The pump could take any suitable form. In other embodiments, the causing 501 does not comprise such operation of a pump. For example, as also discussed above, in some embodiments fuel may be able to flow from the settling tank 110 through the first filter 122, 222 and to the service tank 130 under the influence of gravity.

In some embodiments, the method comprises receiving 503 a signal indicative of a condition of the first filter 122, 222 or of a parameter of fuel at a location between the first filter 122, 222 and the service tank 130. This signal may be provided according to any of the schemes discussed herein. Accordingly, in some embodiments, the method comprises receiving the signal while the filtration system 120, 220 is operating in the first mode (as indicated by the dotted line in FIG. 5). In some embodiments, the method comprises receiving 503 the signal after the filtration system 120, 220 has ceased operating in the first mode. For example, the condition or parameter may be monitored and reported (e.g. to the controller 140) even when fuel is not passing into the service tank 130.

In some embodiments, the method comprises causing 504 closure of a valve 121 to prevent or hinder fuel flow from the first filter 122, 222 towards the settling tank 110, when it is determined that the fuel pressure is less than a predetermined threshold fuel pressure. In other embodiments, this operation may be omitted. For example, as discussed above, in some embodiments the valve 121 may be a non-return valve configured so that fuel is unable to flow from the first filter 122 to the settling tank 110 via the valve 121, and so the valve 121 may not need actively closing. In some embodiments, the fuel pump 221 may instead be configured to prevent or hinder fuel flow from the first filter 222 towards the settling tank 110.

The method also comprises causing 505 the filtration system 120, 220 to operate in a second mode whereby fuel flows from the service tank 130 through the first filter 122, 222 to dislodge the contaminants from the first filter 122, 222.

As discussed above, in some embodiments the causing 505 the filtration system 120, 220 to operate in the second mode comprises causing 506 operation of a pump to pump fuel from the service tank 130 through the first filter 122, 222 to dislodge the contaminants from the first filter 122, 222. The pump may be the second pump 124 shown in FIG. 2, the backflush pump 222a shown in FIG. 3, or another pump. The pump could take any suitable form. In other embodiments, the causing 505 does not comprise such operation of a pump. For example, as also discussed above, in some embodiments fuel may be able to flow from the service tank 130 through the first filter 122, 222 under the influence of gravity.

In some embodiments, the causing 505 the filtration system 120 to operate in the second mode comprises causing 507 the contaminants that have been dislodged from the first filter 122, 222 (and the backflush fuel carrying the contaminants) when the filtration system 120 is operating in the second mode to pass through a second filter 125, 225 of the filtration system, the second filter 125, 225 being for removing the dislodged contaminants from that fuel. This could be according to any of the schemes discussed herein. Accordingly, in some embodiments, the causing 505 the filtration system 120, 220 to operate in the second mode comprises causing 508 fuel from which the second filter 125, 225 has removed the dislodged contaminants to be returned to the settling tank 110. However, in some embodiments, this process (and the second filter 125, 225) may be omitted, as also discussed herein.

In some embodiments, the method returns to 501 after performance of 505 has been completed, so that the filtration system 120, 220 begins to operate in the first mode again.

In some embodiments, the method may be performed by a filtration system controller, such as the controller 140 shown in FIG. 2 or the controller shown in FIG. 3. There is thus also provided a non-transitory computer-readable storage medium storing instructions that, if executed by a processor of a filtration system controller, cause the processor to carry out the method. The processor may be comprised in the controller 140 of FIG. 2, the controller 140 of FIG. 3, or elsewhere.

The skilled reader will therefore appreciate that embodiments of the present invention provide fuel systems for removing solid contaminants from fuel, while addressing the aforementioned problems in conventional, and alternative, systems.

In other embodiments, two or more of the above described embodiments may be combined. In other embodiments, features of one embodiment may be combined with features of one or more other embodiments.

Embodiments of the present invention have been discussed with particular reference to the examples illustrated.

However, it will be appreciated that variations and modifications may be made to the examples described within the scope of the invention.

What is claimed is:

1. A fuel system for an engine of a marine vessel, the fuel system comprising:
 a settling tank for cleaning fuel for the engine and designed to encourage water and sludge separation via gravity;
 a service tank for storing fuel for the engine; and
 a filtration system comprising a first filter through which fuel flowing from the settling tank to the service tank is passable, wherein the settling tank is located such that fuel can flow to the settling tank without first flowing through the first filter;
 wherein the filtration system is configured to be operable in a first mode in which the first filter removes contaminants from fuel flowing from the settling tank to the service tank, and in a second mode in which fuel flows through the first filter to dislodge the contaminants from the first filter, and
 wherein the filtration system comprises a second filter for removing the dislodged contaminants from fuel that has passed through the first filter when the filtration system is operating in the second mode;
 wherein the fuel system comprises a second filter pump for pumping fuel through the second filter;
 wherein the filtration system comprises a first circulation valve and a second circulation valve, which are joined by a circulation path;
 wherein the first circulation valve is located between the first filter and the second filter;
 wherein the second circulation valve is located between the second filter and the settling tank;
 wherein the first and second circulation valves are controllable to direct fuel pumped by the second filter pump in a circuit comprising the first and second circulation valves, the circulation path, the second filter pump, and the second filter, so that the second filter pump is able to cause fuel to be passed through the second filter and back to the second filter pump plural times; and
 wherein the circuit is isolated from the first filter by the first and second circulation valves, so that the filtration system is operable in the first mode while the second filter pump is causing fuel to be passed through the second filter and back to the second filter pump plural times.

2. The fuel system of claim 1, wherein the filtration system comprises a backflush pump for pumping fuel through the first filter when the filtration system is operating in the second mode.

3. The fuel system of claim 2, wherein the backflush pump is upstream of the first filter when the filtration system is operating in the second mode.

4. The fuel system of claim 1, wherein the first filter comprises a series of filters.

5. The fuel system of claim 1 wherein the filtration system comprises a fuel pump for pumping fuel from the settling tank through the first filter to the service tank when the filtration system is operating in the first mode.

6. The fuel system of claim 1, wherein the filtration system comprises a valve through which fuel flowing from the settling tank to the first filter passes in use, wherein the valve is for controlling fuel flow from the first filter towards the settling tank.

7. The fuel system of claim 6, wherein the filtration system is configured so that the valve is closed to prevent or hinder fuel flow from the first filter towards the settling tank, when the filtration system is operating in the second mode.

8. The fuel system of claim 1, wherein the filtration system comprises a collector for collecting the contaminants removed by the second filter.

9. The fuel system of claim 1, wherein the first filter is connected to the settling tank via the second filter, whereby fuel from which the second filter has removed the dislodged contaminants is returnable to the settling tank.

10. The fuel system of claim 1, wherein the filtration system comprises a backflush pump for pumping fuel through the first filter when the filtration system is operating in the second mode, and wherein the service tank is connected to the first filter via the backflush pump.

11. The fuel system of claim 1, comprising a filtration system controller for controlling the filtration system.

12. The fuel system of claim 11, wherein the filtration system comprises a sensor configured to detect a condition of the first filter or a parameter of fuel at a location between the first filter and the service tank and to send a signal to the filtration system controller on the basis of the condition or parameter detected, and
 wherein the filtration system controller is configured to cause the filtration system to operate in the second mode on the basis of the signal.

13. A marine vessel comprising the fuel system of claim 1.

14. The fuel system of claim 1, wherein the settling tank is configured to have fuel capacity sufficient for at least twenty-four hours of full load operation of all consumers aboard the marine vessel.

15. A method of operating a filtration system of a fuel system for an engine of a marine vessel, the method comprising:
 causing the filtration system to operate in a first mode whereby fuel flows from a settling tank of the fuel system to a service tank of the fuel system via a first filter of the filtration system, the first filter being for removing contaminants from the fuel, the settling tank of the fuel system designed to encourage water and sludge separation via gravity and located such that fuel can flow to the settling tank without first flowing through the first filter of the filtration system; and
 causing the filtration system to operate in a second mode whereby fuel flows through the first filter to dislodge the contaminants from the first filter,
 wherein the causing the filtration system to operate in the second mode comprises causing the contaminants that have been dislodged from the first filter and the fuel that has passed through the first filter when the filtration system is operating in the second mode to pass through a second filter of the filtration system, the second filter being for removing the dislodged contaminants from the fuel that has passed through the first filter when the filtration system is operating in the second mode;
 wherein the fuel system comprises a second filter pump for pumping fuel through the second filter;
 wherein the filtration system comprises a first circulation valve and a second circulation valve, which are joined by a circulation path;
 wherein the first circulation valve is located between the first filter and the second filter;
 wherein the second circulation valve is located between the second filter and the settling tank; and wherein the method comprises causing operation of the second filter pump and controlling the first and second circulation valves to direct fuel pumped by the second filter pump in a circuit comprising the first and second circulation valves, the circulation path, the second filter pump, and the second filter, so that the second filter pump is able to cause fuel to be passed through the second filter and back to the second filter pump plural times; and wherein the method comprises causing the circuit to be isolated from the first filter by the first and second circulation valves, and causing the filtration system to operate in the first mode while the second filter pump is causing fuel to be passed through the second filter and back to the second filter pump plural times.

16. A non-transitory computer-readable storage medium storing instructions that, if executed by a processor of a filtration system controller, cause the processor to carry out the method of claim 15.

17. The method of claim 15,
wherein the settling tank is configured to have fuel capacity sufficient for at least twenty-four hours of full load operation of all consumers aboard the marine vessel.

* * * * *